Figure 1:
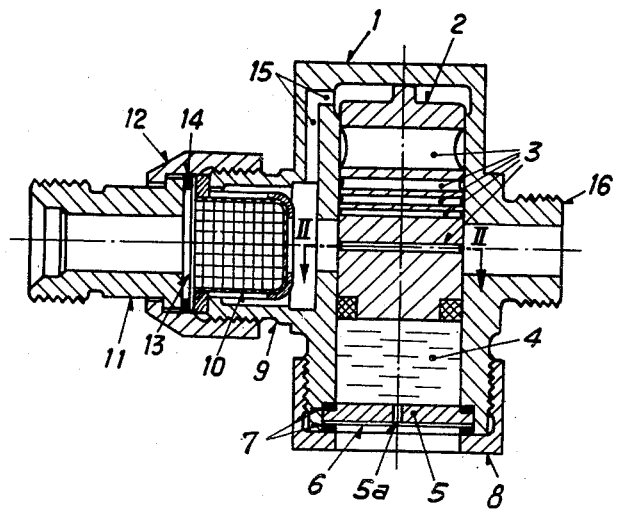

May 3, 1955

H. THOMANN ET AL 2,707,479

STARTING VALVE FOR JET PROPULSION DEVICES

Filed March 12, 1954

INVENTORS
HANS THOMANN
ARNOLD STECK

BY
*Henderoth, Lind & Ponack*
*Attorneys*

United States Patent Office 2,707,479
Patented May 3, 1955

2,707,479

STARTING VALVE FOR JET PROPULSION DEVICES

Hans Thomann and Arnold Steck, Vaduz (Bartlegrosch), Liechtenstein, assignors to Machine Tool Works Oerlikon, Administration Company, Zurich-Oerlikon, Switzerland, a company of Switzerland Application March 12, 1954, Serial No. 415,934

Claims priority, application Switzerland March 20, 1953

2 Claims. (Cl. 137—70)

The invention relates to a starting valve for jet propulsion devices, for example rocket motors, which operate with liquid, self-igniting fuel combinations, for example with nitric acid as the oxygen carrier, and activated kerosene or an amine-xylidine mixture as the fuel proper, both these components to be referred to as "fuels" for brevity.

In such rocket motors the accurate control of the starting phase is one of the most difficult problems, and it is a main object of the present invention to provide a starting valve allowing the said fuels to be injected in accurately metered quantities into the combustion chamber of the said motor in order to attain faultless starting. It is another object of the invention to control effectively the velocity of injecting the said fuels so as not to exceed a predetermined magnitude. It is a further object of the invention continuously to increase the supply of the said fuels from zero until the full propulsive force is attained, while maintaining the correct mixing ratio of the said fuels with one another. It is yet another object of the invention to provide a starting valve which allows the whole starting process to be completed in a period not exceeding substantially one second.

Various starting valves for rocket motors have been proposed, for example automatic systems using solenoids for electromagnetically controlling the cross section area available for the fuels. Valves have also been suggested in which compressed air acts on a spring loaded membrane or piston, which, in turn, moves a conical spindle in the sense of increasing the cross section area available for the passage of the said fuels. Such starting valves which are operated through a separate control medium like compressed air, or by electric current, have, however, a comparatively complicated construction considering their short period of action. It is still another object of the invention to provide a starting valve which is simple in construction and operation.

With these and other objects in view we provide a starting valve for jet propulsion motors for the control of the fuel supply to the combustion chamber thereof during the starting phase from zero to full load, comprising in combination: a valve casing having an inlet socket and an outlet socket, a piston slidably arranged in the said casing and having transverse bores of different cross section area adapted to connect the said inlet socket to the said outlet socket in accordance with the actual position of the said piston, a space in the said casing at one end of the said piston being in communication with the said inlet socket, and a diaphragm having a calibrated bore and a breakable membrane obstructing a space in the said casing on the other end of the said piston filled with a liquid discharged through the said calibrated bore by the piston moving under the pressure of the fuel from the said inlet socket and thereby controlling the velocity of movement of the said piston bringing successively transverse bores of increasing cross section area into operative position connecting the said inlet socket and outlet socket.

Preferably a second breakable membrane is arranged between the said inlet socket and the said piston, the said second membrane being dimensioned so as to be burst open by a predetermined fraction of the fuel supply pressure.

Figure 2:
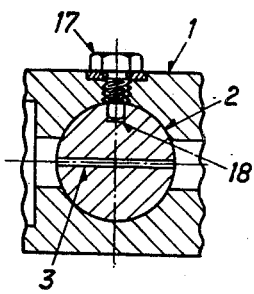

These and other objects and features of our invention will be clearly understood from the following description of an embodiment thereof given by way of example with reference to the accompanying drawing, in which:

Fig. 1 is a longitudinal section of a starting valve, and
Fig. 2 is a cross section along the line 2—2 of Fig. 1.

The valve casing 1 contains the piston 2 having several bores 3 of different cross section area for dosage. In Fig. 1 the said piston is illustrated in its initial position prior to the beginning of the starting period. The cylinder space 4 ahead of the piston 2 is filled with a blocking liquid, the viscosity of which should be as independent of temperature as possible, a requirement which is for example met by certain silicones. This cylinder space 4 is closed by a diaphragm 5 provided with a calibrated bore 5a, and by a thin membrane 6 which, after the blocking liquid has been filled in, are both fixed to the valve casing 1 by means of a cap nut 8, with packing rings 7 interposed.

The valve casing 1 has an entrance socket 9 with a filter sieve 10 built in, a second thin membrane 13 being arranged between said filter sieve 10 and a connector nipple 11 which is clamped fast by means of a cap nut 12, with a packing ring 14 interposed between said nipple 11 and membrane 13. In the casing 1 an angular conduit 15 is provided which connects the entrance side with the cylinder space behind the piston 2. The piston 2 is restrained against rotating, for example by means of a laterally arranged screw 17 which engages into a guide slot 18 extending not quite over the full length of the piston 2.

The manner of operation of the starting valve according to our invention is briefly as follows: The connector nipple 11 is attached to the connection line to the fuel tank. The fuel cannot, however, enter into the valve casing 1 prior to the beginning of the starting operation, since the membrane 13 obturates the entrance opening. This membrane is so dimensioned that it breaks at a pressure of for example one-quarter of the supply pressure of the fuel. When now the fuel supply is switched on at the beginning of the starting operation, the membrane 13 is burst open, and the fuel passes through the filter sieve 10 into the entrance socket 9, and through the foremost, and smallest, of the dosage bores 3 to the discharge socket 16 and hence into the combustion chamber (not shown). At the same time, fuel under pressure flows also through the conduit 15 into the cylinder space behind the piston 2, whereby the latter is pushed forward, putting the blocking liquid in the cylinder space 4 under pressure. Thereby the membrane 6 is burst open, and the blocking liquid flows off through the calibrated bore 5a of the diaphragm 5. The piston 2 moves accordingly with a velocity which is accurately determined by the velocity of discharge of the blocking liquid, in the forward direction, so that successively larger dosage bores 3 come into action, and the quantity of fuel flowing through the valve increases steadily, until eventually the rearmost and largest of the dosage bores is cleared, whereby the full fuel supply to the combustion chamber is attained.

While we have hereinabove described, and illustrated in the accompanying drawing, what may be considered a typical and particularly advantageous embodiment of our said invention, we wish it to be understood that we do not limit ourselves to the particular details and dimensions described and illustrated, for obvious modifications will occur to a person skilled in the art.

What we claim as our invention and desire to secure by Letters Patent, is:

1. A starting valve for jet propulsion motors for the control of the fuel supply to the combustion chamber thereof during the starting phase from zero to full load, comprising in combination: a valve casing having an inlet socket and an outlet socket, a piston slidably arranged in the said casing and having transverse bores of different cross section area adapted to connect the said inlet socket to the said outlet socket in accordance with the actual position of the said piston, a space in the said casing at one end of the said piston being in communication with the said inlet socket, and a diaphragm having a calibrated bore and a breakable membrane obstructing a space in the said casing on the other end of the said piston filled with a liquid discharged through the said calibrated bore by the piston moving under the pressure of the fuel from the said inlet socket, and thereby controlling the velocity of movement of the said piston, bringing successively transverse bores of increasing cross section area into operative position connecting the said inlet socket and outlet socket.

2. A starting valve as claimed in claim 1, comprising in addition: a second breakable membrane arranged between the said inlet socket and the said piston, the said second membrane being dimensioned so as to be burst open by a predetermined fraction of the fuel supply pressure.

No references cited.